Feb. 11, 1969  A. D. HAWKINS  3,426,729
APPARATUS FOR FLOCKING ARTICLES
Filed May 25, 1967
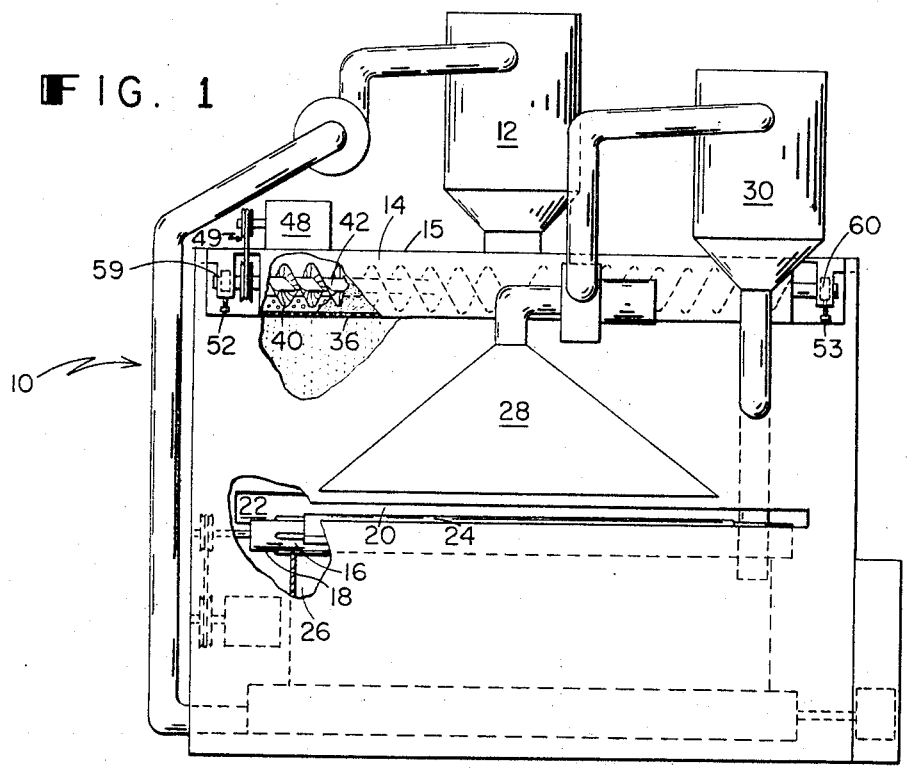
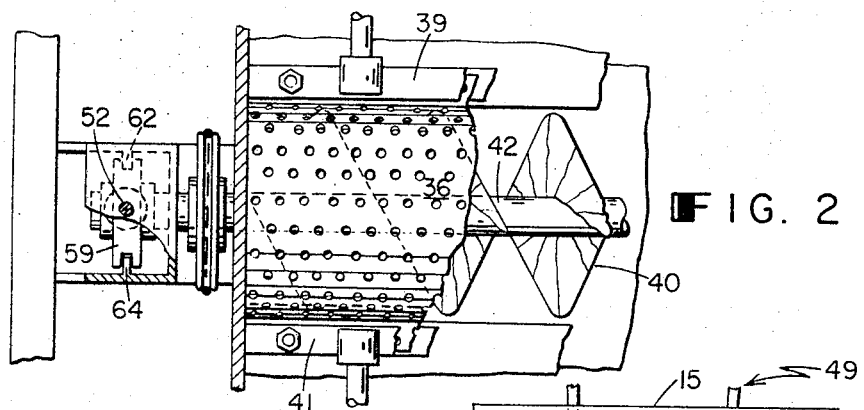
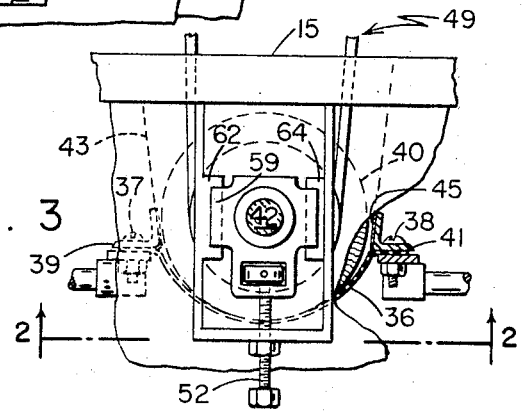

United States Patent Office 3,426,729
Patented Feb. 11, 1969

3,426,729
APPARATUS FOR FLOCKING ARTICLES
Arthur D. Hawkins, Cumberland, R.I., assignor to Indev, Inc., Pawtucket, R.I., a corporation of Rhode Island
Filed May 25, 1967, Ser. No. 641,259
U.S. Cl. 118—312        7 Claims
Int. Cl. B05b 7/14, 15/04

ABSTRACT OF THE DISCLOSURE

A flocking machine in which the flock distributor includes a trough having a smooth perforated surface (such as perforated sheet brass) for passing flock from a supply through the perforations to the article to be flocked, and a spreader, such as a rotary brush, for uniformly distributing flock over the perforated surface.

---

This invention relates to feeding flock in flocking apparatus.

Objects of the invention are to provide rapid and uniform controlled flock flow into a flocking apparatus without introducing mechanical, electrostatic, or other interference with that flow and without damaging the flock, all with a simple, inexpensive, and reliable structure.

The invention features a flock distributor in which a trough has a smooth, perforated surface in communication with a flock supply and a second surface in communication with the article being flocked, and a spreader is arranged to spread flock from the supply over and in contact with the smooth surface to the perforations therethrough. In preferred embodiments a spiral spreading brush is mounted for rotation; the trough has a wall formed of a continuous sheet of smooth perforated metal (preferably brass); the metal is perforated over 20 to 60 percent of its surface area; the brush has a diameter of about 90% of that of the trough; and there are provided in the flocking apparatus a feed cyclone connected to the distributor, inlet and outlet openings for the article to be flocked, a blanket support and a blanket extending between the openings beneath the distributor, beater bar assemblies, and a return for unused flock.

Other objects, features, and advantages will appear from the following description of a preferred embodiment of the invention, taken together with the attached drawings thereof, in which:

FIG. 1 is an end view partially broken away of a flocking machine;

FIG. 2 is a view along 2—2 of FIG. 3; and

FIG. 3 is a side view partially in section of the distributor chamber.

There is shown in the drawings a flocking apparatus 10 which includes cyclone 12 which feeds distributor 14, beater bars 16 (each having a cylindrical casing 18 with longitudinal bars welded to its periphery at equal intervals and being driven in rotation by a belt and pulley arrangement) beneath the distributor, and entrance and exit openings 20, 22 for the article to be flocked. Rubber blanket 24 is stretched over beater bars 16 and is anchored at its ends to the framework adjacent openings 20, 22. Collector hopper 26 is mounted beneath the beater bars. Suction clean-off nozzle 28 above blanket 24 is connected to return cyclone 30.

Distributor 14 includes a framework 15 along the bottom of which is mounted a semi-cylindrical sheet brass member 36 (radius 3⅜ inches) perforated over 35% of its area with staggered round holes $\frac{3}{32}$ inch in diameter (for 3 denier, 2 millimeter synthetic flock—in general 20–60% of the area should be perforated). Member 36 is bent along its longitudinal edges to provide flanges bolted at 37, 38 to supports 39, 41. Imperforate sides 43, 45 continue up from member 26. The inside surface of member 36 communicates through the open top of framework 15 with cyclone 12.

Spiral brush 40 (3 inch radius, about 90% of the radius of member 36) is carried on shaft 42 journaled at its ends in blocks 59, 60 which slide on tracks 62, 64 mounted on framework 15. Adjustment screws 52, 53 pass through the bottom of framework 15 and control the height of blocks 59, 60. Motor 48 and chain drive 49 rotate brush 40.

In operation, flock is fed from cyclone 12 to distributor 14 and is spread by rotating brush 40 over the entire length of the surface of sheet brass member 36 into the perforations. The flock flows through the perforations and is evenly distributed over and bonded to the article supported on blanket 24. Beater bars 16 vibrate the article. Loose flock is picked up by hopper 26 or nozzle 28 and eventually returned to cyclone 12. Adjustment of screws 52, 53 allows the spiral brush to be operated either in contact with the perforated surface or spaced therefrom.

Other embodiments will occur to those skilled in the art and are within the following claims.

What is claimed is:

1. In a flocking apparatus having a flock supply and a support for an article to be flocked, a flock distributor comprising
    a trough having a continuous smooth sheet form, perforated surface in communication with said supply and an opposite surface in communication with said article being flocked, and
    a spreader for spreading flock from said supply over and in contact with said smooth surface to the perforations therethrough.

2. The apparatus of claim 1 wherein said spreader is a spiral brush mounted for rotation relative to said smooth surface.

3. The apparatus of claim 1 wherein said trough has a wall of a continuous sheet of smooth perforated metal.

4. The apparatus of claim 3 wherein said metal is brass.

5. The apparatus of claim 1 wherein said perforations cover between 20 and 60 percent of the surface area of smooth surface.

6. The apparatus of claim 2 wherein said brush has a diameter equal to 90 percent of the diameter of said trough.

7. Flocking apparatus comprising
    a feed cyclone
    a feed distributor connected to said cyclone and comprising
        a longitudinal chamber having a lower feed wall of sheet metal perforated over 20 to 60 percent of its surface area, and
        a rotary spiral brush secured to a rotatable shaft journaled in blocks adjustable toward and away from said feed wall, inlet and outlet openings for the article to be flocked, a blanket support having a blanket secured thereto and extending between said openings beneath said distributor, beater bar assemblies contacting said blanket and imparting vibratory motion thereto, and a return for unused flock communicating with said feed cyclone.

References Cited

UNITED STATES PATENTS

| | | | |
|---|---|---|---|
| 304,492 | 9/1884 | Birge | 118—308 X |
| 465,815 | 12/1891 | Claus | 118—308 |
| 1,784,459 | 12/1930 | Lipsius | 118—312 X |

WALTER A. SCHEEL, *Primary Examiner.*

JOHN P. McINTOSH, *Assistant Examiner.*

U.S. Cl. X.R.

118—326